(12) United States Patent
Jain et al.

(10) Patent No.: US 7,814,047 B2
(45) Date of Patent: *Oct. 12, 2010

(54) DIRECT LOADING OF SEMISTRUCTURED DATA

(75) Inventors: Namit Jain, Folsom, NJ (US); Nipun Agarwal, Santa Clara, CA (US); Ravi Murthy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1775 days.

This patent is subject to a terminal disclaimer.

(21) Appl. No.: 10/648,600

(22) Filed: Aug. 25, 2003

(65) Prior Publication Data

US 2005/0050092 A1 Mar. 3, 2005

(51) Int. Cl.
*G06F 17/30* (2006.01)
(52) U.S. Cl. ..................................................... 707/602
(58) Field of Classification Search .................. 707/602
See application file for complete search history.

(56) References Cited

U.S. PATENT DOCUMENTS

| 5,295,261 | A | 3/1994 | Simonetti | 395/600 |
|---|---|---|---|---|
| 5,467,471 | A | 11/1995 | Bader | 395/600 |
| 5,649,200 | A | 7/1997 | Leblang et al. | |
| 5,680,614 | A | 10/1997 | Bakuya et al. | |
| 5,724,577 | A | 3/1998 | Exley et al. | 395/611 |
| 5,734,887 | A | 3/1998 | Kingberg et al. | 395/604 |
| 5,964,407 | A | 10/1999 | Sandkleiva | |
| 5,974,407 | A | 10/1999 | Sacks | 707/2 |
| 6,047,322 | A | 4/2000 | Vaid et al. | |
| 6,085,198 | A | * 7/2000 | Skinner et al. | 707/103 R |

(Continued)

FOREIGN PATENT DOCUMENTS

EP 0 856 803 8/1998

(Continued)

OTHER PUBLICATIONS

"SerialJavaObject (Java 2 Platform SE 5.0)", Available online at: http://java.sun.com/j2se/1.5.0/docs/api/javax/sql/rowset/serial/SerialJavaObject.html. Accessed Apr. 10, 2006. Copyright 2004 Sun Microsystems.*

(Continued)

*Primary Examiner*—Neveen Abel Jalil
*Assistant Examiner*—Mark A Radtke
(74) *Attorney, Agent, or Firm*—Hickman Palermo Truong & Becker LLP; Christian A. Nicholes

(57) ABSTRACT

Techniques and systems are disclosed for directly storing semistructured data in a database. According to one aspect, a client application reads data that comprises instances of a parent type. The client application invokes routines associated with the parent type. An array is created for storing instances of the parent type. These routines invoke routines associated with a child type of the parent type. An array is created for storing instances of the child type. The arrays are populated with values specified in the data. According to one aspect, some columns of the arrays may be populated with other values to be stored in hidden columns of database tables. The client application converts the arrays into a data stream that conforms to the format of the database's data blocks. The client application then streams the data to a database server, which writes the data blocks directly into one or more data blocks in the database.

26 Claims, 9 Drawing Sheets

U.S. PATENT DOCUMENTS

| | | | |
|---|---|---|---|
| 6,115,705 | A | 9/2000 | Larson |
| 6,360,302 | B1 | 3/2002 | Baylor |
| 6,470,494 | B1 * | 10/2002 | Chan et al. ............... 717/166 |
| 6,542,911 | B2 | 4/2003 | Chakraborty et al. |
| 6,571,231 | B2 | 5/2003 | Sedlar ........................ 707/1 |
| 6,643,633 | B2 | 11/2003 | Chau et al. |
| 6,654,761 | B2 | 11/2003 | Tenev et al. |
| 6,662,342 | B1 | 12/2003 | Marcy |
| 6,675,230 | B1 | 1/2004 | Lewallen |
| 6,718,322 | B1 | 4/2004 | Brye ........................... 707/3 |
| 6,721,723 | B1 | 4/2004 | Gibson et al. |
| 6,754,661 | B1 | 6/2004 | Hallin et al. ............. 707/100 |
| 6,772,180 | B1 | 8/2004 | Li et al. |
| 6,804,677 | B2 | 10/2004 | Shadmon et al. |
| 6,826,568 | B2 | 11/2004 | Bernstein et al. |
| 6,915,304 | B2 | 7/2005 | Krupa |
| 6,915,307 | B1 * | 7/2005 | Mattis et al. ..................... 1/1 |
| 6,941,511 | B1 | 9/2005 | Hind et al. |
| 6,957,237 | B1 | 10/2005 | Traversat et al. |
| 6,964,025 | B2 | 11/2005 | Angiulo et al. |
| 7,024,425 | B2 * | 4/2006 | Krishnaprasad et al. .. 707/104.1 |
| 7,031,956 | B1 | 4/2006 | Lee et al. |
| 7,036,072 | B1 | 4/2006 | Sulisito et al. |
| 7,062,507 | B2 | 6/2006 | Wang et al. |
| 7,107,282 | B1 | 9/2006 | Yalamanchi |
| 7,113,942 | B2 | 9/2006 | Levanoni et al. |
| 7,134,072 | B1 | 11/2006 | Lovett et al. |
| 7,139,746 | B2 | 11/2006 | Shin et al. |
| 7,287,033 | B2 | 10/2007 | Shadmon et al. |
| 7,353,222 | B2 | 4/2008 | Dodds et al. |
| 7,405,522 | B2 | 7/2008 | Riddle |
| 7,451,128 | B2 | 11/2008 | Song et al. |
| 7,457,910 | B2 | 11/2008 | Chang et al. |
| 7,519,903 | B2 | 4/2009 | Yahagi |
| 2001/0049675 | A1 | 12/2001 | Mandler et al. |
| 2001/0049818 | A1 | 12/2001 | Banerjia et al. |
| 2002/0029229 | A1 | 3/2002 | Jakopac et al. |
| 2002/0056025 | A1 | 5/2002 | Qiu et al. |
| 2002/0078068 | A1 | 6/2002 | Krishnaprasad et al. |
| 2002/0087510 | A1 | 7/2002 | Weinberg et al. |
| 2002/0087596 | A1 | 7/2002 | Lewontin |
| 2002/0116371 | A1 | 8/2002 | Dodds et al. |
| 2002/0147763 | A1 * | 10/2002 | Lee et al. .................... 709/202 |
| 2002/0184188 | A1 | 12/2002 | Mandyam et al. |
| 2003/0004937 | A1 | 1/2003 | Salmenkaita et al. |
| 2003/0033285 | A1 | 2/2003 | Jalali et al. |
| 2003/0115421 | A1 | 6/2003 | McHenry et al. |
| 2003/0120665 | A1 | 6/2003 | Fox et al. |
| 2003/0140308 | A1 * | 7/2003 | Murthy et al. ............. 715/500 |
| 2003/0154204 | A1 | 8/2003 | Chen-Wright et al. |
| 2003/0204787 | A1 | 10/2003 | Bartucca et al. |
| 2003/0236903 | A1 | 12/2003 | Piotrowski |
| 2004/0015936 | A1 * | 1/2004 | Susarla et al. ............... 717/166 |
| 2004/0043758 | A1 | 3/2004 | Sorvari et al. |
| 2004/0044959 | A1 | 3/2004 | Shanmugasundaram et al. |
| 2004/0066529 | A1 | 4/2004 | Wu et al. |
| 2004/0088320 | A1 | 5/2004 | Perry |
| 2004/0088415 | A1 | 5/2004 | Chandrasekar et al. |
| 2004/0117359 | A1 * | 6/2004 | Snodgrass et al. .............. 707/3 |
| 2004/0167864 | A1 | 8/2004 | Wang et al. |
| 2004/0176958 | A1 | 9/2004 | Salmenkaita et al. |
| 2004/0225680 | A1 | 11/2004 | Cameron et al. |
| 2005/0050092 | A1 | 3/2005 | Jain et al. |
| 2005/0050105 | A1 | 3/2005 | Idicula et al. |
| 2005/0102256 | A1 | 5/2005 | Bordawekar et al. |
| 2005/0228818 | A1 | 10/2005 | Murthy et al. |
| 2006/0036935 | A1 * | 2/2006 | Warner et al. ............. 715/500 |
| 2006/0047717 | A1 | 3/2006 | Pereira |
| 2006/0200439 | A1 | 9/2006 | Bhatia et al. |
| 2007/0005624 | A1 | 1/2007 | Wu et al. |
| 2007/0043751 | A1 | 2/2007 | Chen et al. |
| 2007/0168327 | A1 | 7/2007 | Lindblad et al. |

FOREIGN PATENT DOCUMENTS

| | | |
|---|---|---|
| EP | 1 241 589 A2 | 9/2002 |
| WO | WO 01/42881 A2 | 6/2001 |
| WO | WO 03/030031 | 4/2003 |

OTHER PUBLICATIONS

"Conventional and Direct Path Loads" from Oracle9i Database Utilities Release 2. Copyright 2002 Oracle Corporation. Avilable online at http://www.utexas.edu/its/unix/reference/oracledocs/v92/B10501_01/server.920/a96652/ch09.htm.*

Shelley Higgins, Oracle Corporation, "Oracle9i, XML Database Developer's Guide—Oracle XML DB," Release 2 (9.2), Oct. 2002, Part No. A96620-02, pp. 1-1,044 (text provided on CD-ROM).

Ipedo, Inc., "Ipedo XML Database 3.1: Developer's Guide," 2001, XP-002306148, 12 pages.

Chris Parkerson, "Ipedo XML Database 3.1 Now Available," Jul. 22, 2002, XP-002306149, pp. 1-2.

Can Türker, "Schema Evolution in SQL-99 and Commercial (Object-) Relational DBMS," $9^{th}$ International Workshop on Foundations of Models and Languages for Data and Obejcts Fomlado/Demm 2000, Sep. 18, 2000, XP-002306150, pp. 1-32.

Hong Su et al., "XEM: XML Evolution Management," Jan. 2002, XP-002306151, pp. 1-32.

Yuan Wang et al., "X-Diff: An Effective Change Detection Algorithm for XML Documents," Proceedings of the $19^{th}$ International Conference on Data Engineering (ICDE'03), 2003, IEEE, pp. 519-530.

Awais Rashid, "A Framework for Customisable Schema Evolution in Object-Oriented Databases," Proceedings of the Seventh International Database Engineering and Applications Symposium (IDEAS'03), 2003, IEEE, 5 pages.

Xue Li, "A Survey of Schema Evolution in Object-Oriented Databases," 1999, IEEE, pp. 362-371.

International Search Authority, "Notification of Transmittal of the International Search Report and the Written Opinion of the International Search Authority, or the Declaration," Dec. 8, 2004, International Application No. PCT/US2004/027464, 14 pages.

"Current Claims of PCT/US2004/027464," pp. 1-7.

Chen, Ruey-Shun et al., "Developing an XML framework for metadata system", Trinity College Dublin, Proc. of the $1^{st}$ Inter. Sympo. on Information and Communication, pp. 267-272.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.

MacKenzie, David et al., "Finding Files", GNU Findutils Version 4.1.2, Nov. 1994, 38 pages.

Claims, International application No. PCT/US2006/045700, 2 pages.

European Patent Office, "Notification of Transmittal of the International Search Report and the Written Opinion of the International Searching Authority, or the Declaration", International application No. PCT/US2006/045700, dated Jul. 20, 2007, 12 pages.

Chakraborty, Krishnendu, et al., "The XML Garbage Collector", XP-002297849, The Source for Developers & Sun Developer Network Site, Technical Articles & Tips, dated Mar. 2002, 5 pages.

Oracle, "Oracle IFS (Internet Filing System)", Technical Data Sheet, Mar. 1999, 4 pages.

Lo et al., XAS: A System for Accessing Componentized, Virtual XML Documents, May 2001, Proceedings of ICSE'01, IEEE Press, p. 493-502, <Retrieved from IEEE Explore May 4, 2009>.

Meyer et al, "GenDBDan open source genome annotation system for prokaryote genomes", Apr. 2003, Nucleic Acids Research, p. 2187-2195.

Shah et al, "Pegasys: software for executing and integrating analyses of biological sequences", Apr. 2004, BMC Bioinformatics, p. 1-16, <Retrieved from BioMed Central, May 4, 2009>.

Mungall et al, "An integrated computational pipeline and database to support whole-genome sequence annotation", Dec. 2002, GenomeBiology.com p. 1-11, <Retrieved from GenomeBiology May 4, 2002>.

* cited by examiner

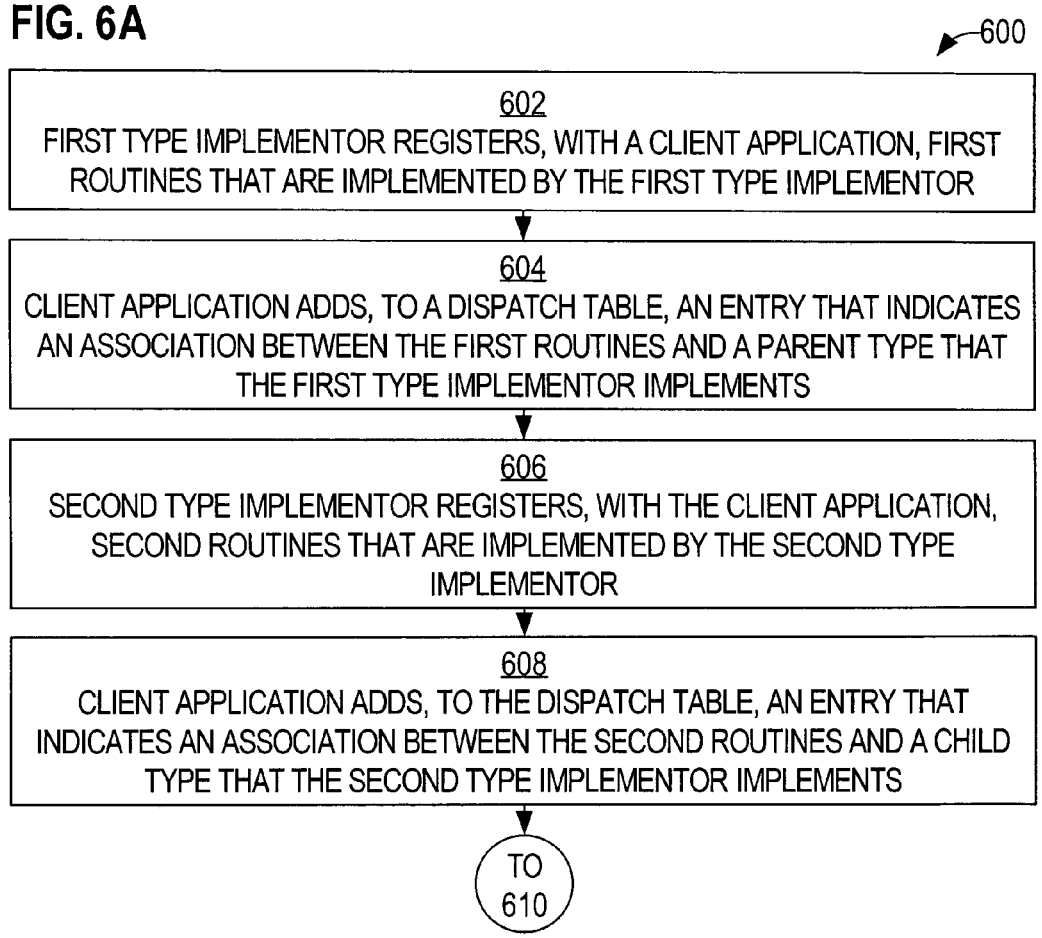

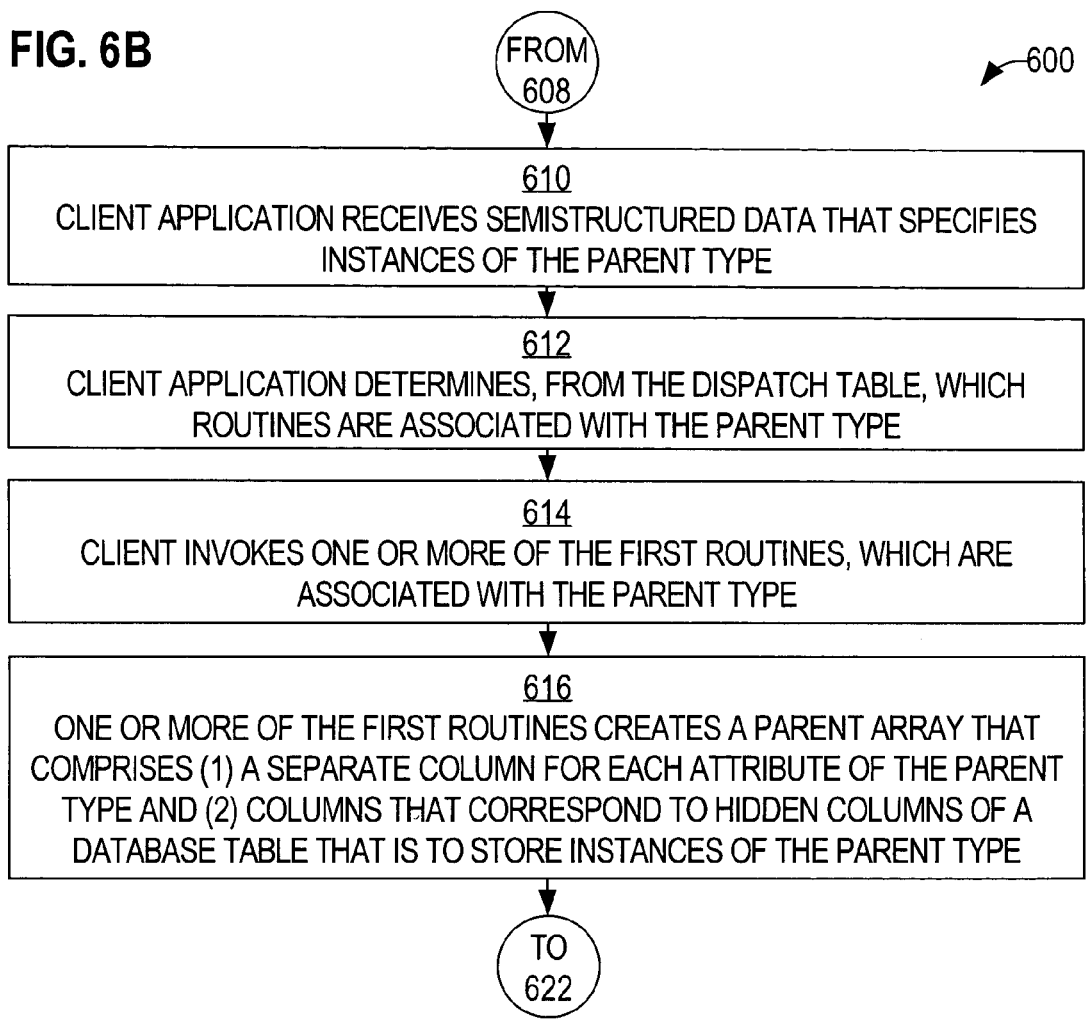

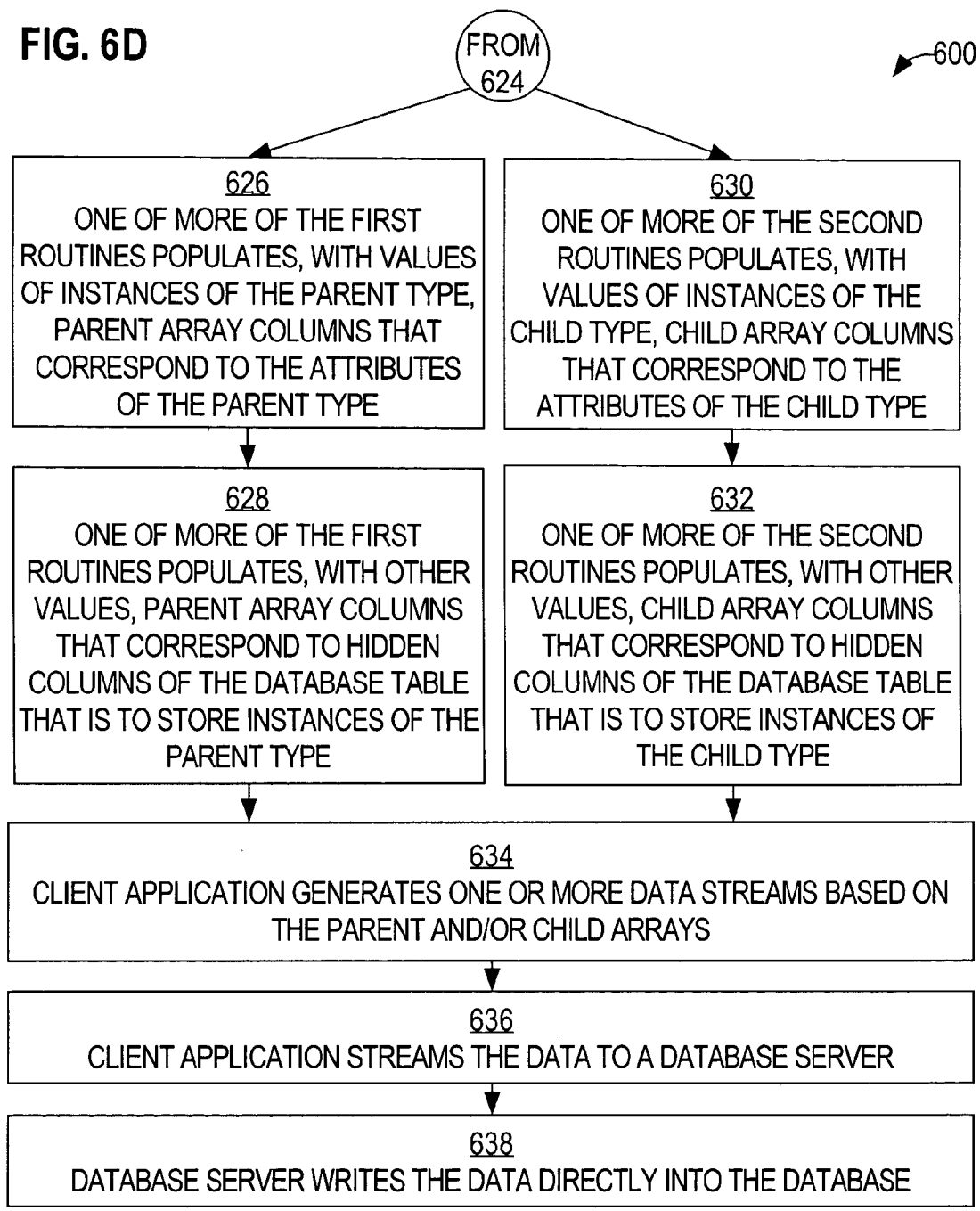

DIRECT LOADING OF SEMISTRUCTURED DATA

RELATED APPLICATIONS

The present application is related to the following U.S. patent applications, the entire contents of which are incorporated herein by reference for all purposes:

U.S. patent application Ser. No. 10/192,411, filed on Jul. 9, 2002, entitled OPAQUE TYPES, by Rajagopalan Govindarajan, Viswanathan Krishnamurthy, and Anil Nori;

U.S. patent application Ser. No. 10/260,138, filed on Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on Sep. 27, 2002, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/260,161, filed on Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy;

U.S. patent application Ser. No. 10/648,577, filed on the same day herewith, entitled DIRECT LOADING OF OPAQUE TYPES, by Namit Jain, Ellen Batbouta, Ravi Murthy, Nipun Agarwal, Paul Reilly, and James Stenoish;

U.S. patent application Ser. No. 10/648,749, filed on the same day herewith, entitled IN-PLACE EVOLUTION OF XML SCHEMAS, by Sam Idicula, Nipun Agarwal, Ravi Murthy, and Sivasankaran Chandrasekar; and U.S. patent application Ser. No. 10/648,497, filed on the same day herewith, entitled MECHANISM TO ENABLE EVOLVING XML SCHEMA, by Sam Idicula, Nipun Agarwal, Ravi Murthy, Eric Sedlar, and Sivasankaran Chandrasekar.

FIELD OF THE INVENTION

The present invention relates to database systems, and in particular, to techniques for directly loading semistructured data into a database.

BACKGROUND OF THE INVENTION

Structured data conforms to a type definition. For example, a type definition for a "person" type may define distinct attributes such as "name," "birthdate," "height," "weight," and "gender." Each "instance" of a particular type comprises a separate value for each of the attributes defined by the particular type. For example, an instance of the "person" type might comprise values such as "Fred Brown," "Jan. 1, 1980," "72 inches," "240 pounds," and "male." Each attribute is also of a type. For example, the "name" attribute might be of a "string" type, the "birthdate" attribute might be of "date" type, and the "gender" attribute might be of an "enumerated" type. Structured data might comprise multiple different instances of the same type.

Different approaches may be used to store structured data into a database. One such approach is called "conventional path loading." According to conventional path loading, a client application parses structured data that comprises one or more instances of a type. Values within the structured data correspond to attributes of the type. The client application generates Structured Query Language (SQL) commands, such as INSERT commands, that, when executed by a database server, cause the database server to insert the values into corresponding columns of a database table. Unfortunately, due to its heavy use of the SQL engine, conventional path loading often suffers in terms of performance and memory consumption.

Another approach for storing structured data into a database is called "direct path loading." Through direct path loading, values within structured data are stored directly into a database without causing the SQL engine to load each row of data. By consulting a control file that is associated with the structured data, a client application can determine the types to which instances within the structured data conform. If the structures of the types are defined to the client application, then, based on those structures, the client application can create an array that comprises columns that correspond to the types' attributes. The client application can populate each attribute's corresponding column with values that correspond to that attribute. Once the array is populated, the client application can convert the array into a stream of data that conforms to the format of a database's data blocks. The client application then can stream the data to a database server, which can write the data directly into one or more data blocks in the database. Direct path loading exhibits performance superior to that of conventional path loading.

Some types indicated by a control file may be standard types that are defined to a client application. A scalar type is an example of such a standard type. The client application has information about the characteristics of a scalar type, such as the maximum storage size of a scalar type. With this information, the client can generate the data stream as described above.

However, some types indicated by a control file might not be among the types that are defined to the client application. A type indicated by a control file might have a structure that is defined only to a program that implements that type. Although the type might comprise attributes that are of standard types, the control file and the client application might lack any information about the number or types of such attributes.

Without such information, the client application cannot generate or populate an array that comprises a separate column for each such attribute. The client application does not possess sufficient information to map values that correspond to such attributes to corresponding columns of a table in a relational database. Consequently, there is no effective way for the client application to store instances of such a type in a database using the direct path loading approach.

Types that are not defined to a client application are called "opaque types" relative to the client application, because the internal structure of such types is obscured from the client application. The internal structure of an opaque type, including the number and types of attributes of the opaque type, often are defined only to a program that implements the opaque type. Such a program may be external to both the client application and the database server.

It may not be practical to modify a client application every time that a new type is introduced, so that the new type is defined to the client application. Additionally, the structures of some existing types may change as time passes. It may be impractical to modify a client application every time that the structure of an existing type changes.

One kind of opaque type is an XML type. An example of an XML type is provided in co-pending U.S. patent application Ser. No. 10/259,278. "XML" stands for "Extensible Markup Language." An XML schema is metadata that describes a hierarchical structure. Instances of the XML schema comprise data that conforms to the structure described by the XML schema. Through XML elements expressed in the structure, an XML schema defines one or more types. XML elements in such a structure may be mapped to columns of database tables. Using the conventional path loading approach, values that correspond to the XML elements may be stored in the columns that are mapped to those XML elements.

An XML type is special because an XML type may define alternative structures to which instances of the XML type may conform. For example, an XML type definition might indicate that one or more attributes of the XML type are optional. Therefore, if attributes "A," "B," and "C" are optional, then one instance of the XML type might comprise a value for attribute "A," but no values for attributes "B" or "C," while another instance of the XML type might comprise a value for attribute "B," but no values for attributes "A" or "C." Because the instances may conform to alternative defined structures rather than a single defined structure, the instances may be said to comprise "semistructured" data rather than "structured" data.

At present, client applications are unable to use the direct path loading approach effectively to store semistructured data. Because the direct path loading approach exhibits performance superior to that of the conventional path loading approach, a technique that overcomes the limitations of prior approaches is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A-6D are flow diagrams that illustrate a technique, according to an embodiment of the present invention, for storing semistructured data in a database according to the direct path loading approach.

DETAILED DESCRIPTION OF THE INVENTION

Figure 1:
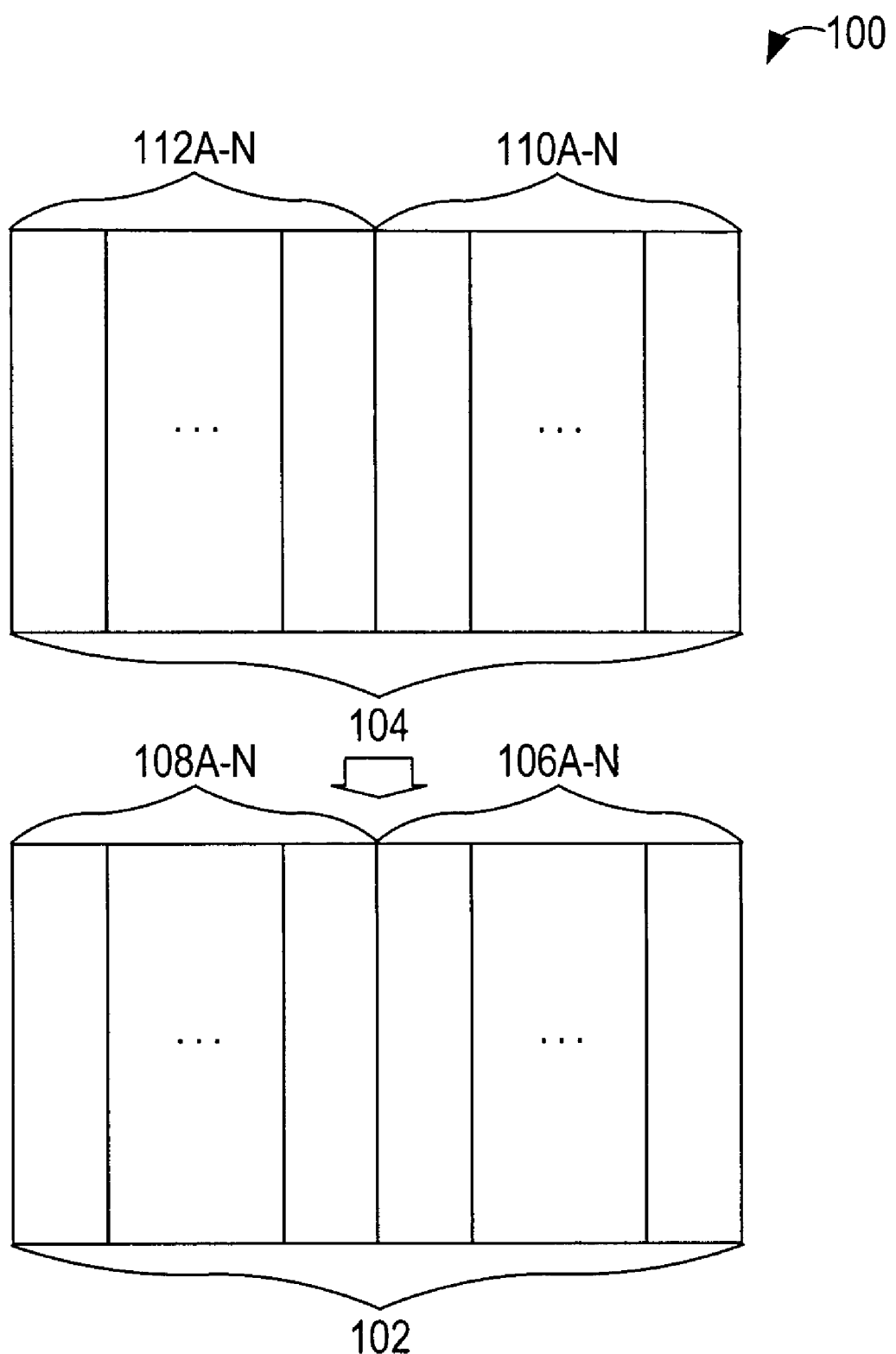
FIG. 1 is a block diagram that illustrates example structures that contain columns for storing values that are not to be displayed to a user.

Techniques and systems are provided for storing semistructured data according to the direct path loading approach. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

It is desirable to store semistructured data in a database according to the direct path loading approach. According to one embodiment of the present invention, a program that implements a type to which semistructured data conforms (a "type implementor") registers, with a client application, one or more routines that are associated with the type. The type implementor, which is external to both the client application and a database server that manages the database, implements the routines. In response to the registration, the client application adds an entry to a dispatch table. The entry indicates the association between the type and the routines.

The client application reads semistructured data that comprises instances of the type. By consulting a control file that is associated with the data, the client application determines that the instances are of the type. The structure of the type, the number of attributes of the type, and the types of those attributes are not defined to the client application. Therefore, the client application locates an entry in the dispatch table that indicates the specified type. The entry indicates the association between the specified type and the routines that are implemented by the type implementor. For example, an entry might indicate an association between an XML type and a set of routines that are implemented by the XML type's implementor.

The client application invokes the routines. One or more of the routines creates an array for storing instances of the type. The array comprises a separate column for each attribute of the type. One or more of the routines populates the columns with values that are specified in the data. Each such value corresponds to a separate attribute of the type. One or more of the routines stores each such value in a column that corresponds to an attribute that corresponds to that value.

The array further may comprise one or more additional columns that correspond to one or more hidden columns of a database table that is to store at least parts of instances of the type. Hidden columns store values that are not displayed to a user when the database table that contains the hidden columns is queried.

One or more of the routines populates the additional columns with additional values that typically are not specified in the data. For example, for each row of the array, a routine might generate a different instance identifier to distinguish the instance stored in that row from other instances stored in other rows. The routine might populate one of the additional columns with the instance identifiers.

For another example, for each row of the array, a routine might generate a different positional descriptor that indicates the position of the various attributes within the instance stored in that row. Such positional descriptors are especially useful in relation to instances of an XML type. Although XML documents express data according to a structure in which each attribute value is located at a different position relative to other attribute values, database table rows that store the values of such XML instances typically are not ordered in a way that indicates a position. By populating an additional column with positional descriptors, the original structure of an XML document can be preserved.

Attributes of one type may conform to other types. For example, a top-level XML type might indicate a first attribute that is of a scalar type, and a second attribute that is of a "purchase order" type. The "purchase order" type also might indicate several attributes. When a type is nested within another type in this manner, routines associated with the nested type are invoked according to the technique described above. For each nested type, the routines associated with that nested type create and populate a separate array that corresponds to that nested type. References to an array generated for a nested type are stored in a corresponding column of an array generated for the type that indicates an attribute that is of the nested type.

With the arrays populated, the client application converts the arrays, including any additional columns, into a data stream that conforms to the format of the database's data blocks. The client application then streams the data to a database server, which writes the data directly into one or more data blocks in the database. As a result, values that were stored in array columns that correspond to database table hidden columns are stored in those hidden columns.

Thus, the client application stores semistructured data in the database according to the direct path loading approach. Because the direct path loading approach does not require the SQL engine to load each row of data, the direct path loading approach is faster and consumes less memory than the conventional path loading approach described above. Because type implementors are external to both the client application and the database server, instances of new types can be stored in the database without modifying either the client application or the database server.

The code that implements the routines that are associated with a particular type may be centralized within the particular type's implementor rather than being distributed among multiple separate programmatic components. Such centralization promotes savings in terms of time and money.

Array Columns Corresponding to Hidden Columns

As is described above, one or more routines associated with a particular type generate an array that contains separate columns for separate attributes of the particular type. The array may also contain one or more columns that correspond to hidden columns of a database table in which instances of the particular type are to be stored.

FIG. 1 is a block diagram that illustrates example structures 100 that contain columns for storing values that are not to be displayed to a user. Structures 100 comprise a database table 102 and an array 104. Database table 102 comprises user-visible columns 106A-106N and hidden columns 108A-108N. User-visible columns 106A-106N correspond to attributes of a type whose instances are to be stored in database table 102.

Routines associated with a type whose instances are to be stored in database table 102 generate array 104. Array 104 comprises array columns 110A-110N and columns 112A-112N. Columns 110A-110N correspond to user-visible columns 106A-106N. Columns 112A-112N correspond to hidden columns 108A-108N.

The routines populate columns 110A-110N with values specified in semistructured data. The routines populate columns 112A-112N with additional values, which might not be specified in the semistructured data. For example, the routines may populate column 112A with instance identifiers that distinguish the instances stored in the rows of array 104, and the routines may populate column 112B with positional descriptors that indicate positions of such instances relative to each other within an original document.

When the routines generate data streams based on array 104, they do so based on the structure of columns 110A-110N and columns 112A-112N and all of the values stored therein. Therefore, when the data are written to a database, values that were stored in columns 110A-110N are stored in user-visible columns 106A-106N, and values that were stored in columns 112A-112N are stored in hidden columns 108A-108N.

Hidden columns are useful for storing information that is needed for re-creating an original document from which values were obtained, especially when that information cannot be derived from the values themselves. For example, such information may indicate some structural aspects of an original document. Because such information is typically used by a computer program and not by a human user, hidden columns are especially appropriate for storing such information.

While an embodiment of the invention is described with reference to arrays, alternative embodiments may use data structures other than arrays to perform the techniques described herein.

Out-of-Line Tables and Nested Tables

As is described above, a type may indicate multiple attributes, one or more of which may be of another type that indicates other attributes. A type of an attribute indicated by another type may be called a nested type. For example, if a type "A" indicates an attribute "X" that is of type "B," then "B" is called a nested type. The nested type and the type that indicates the attribute that is of the nested type may be called the child type and the parent type, respectively, relative to each other. In the above example, type "A" is a parent type relative to type "B," and type "B" is a child type relative to type "A."

Values within instances that conform to nested types may be stored in database tables in any of a variety of ways. Because values may be stored in database tables in a variety of ways, techniques for directly loading semistructured data into database tables should accommodate each of those ways.

For example, given a database table that contains multiple columns for multiple attributes of a parent type, multiple values corresponding to multiple attributes of a child type may be stored together within a single column of that database table as a large object (LOB). Internal delimiters within the LOB may delimit the values that correspond to the child type. When values corresponding to a child type are stored in this manner, the values are said to be stored "in-line."

Figure 2:
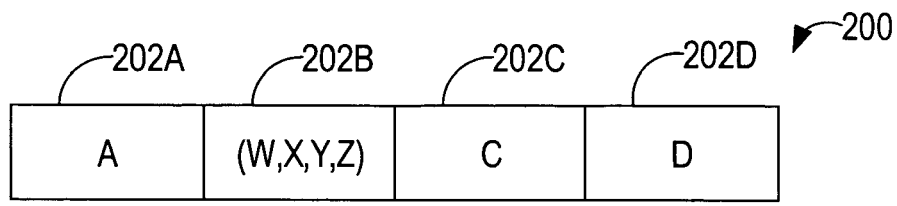
FIG. 2 is a block diagram that illustrates a row of a database table in which multiple values associated with an instance of a child type are stored in-line with values associated with an instance of a parent type.

FIG. 2 is a block diagram that illustrates a row of a database table 200 in which multiple values associated with an instance of a child type are stored in-line with values associated with an instance of a parent type. Values "A," "C", and "D," associated with the parent type, are stored in columns 202A, 202B, and 202D, respectively. Multiple values "(W,X,Y,Z)," associated with the child type, are stored in-line in column 202B as a LOB.

Alternatively, multiple values corresponding to multiple attributes of a child type may be stored in a database table that is separate from the database table that contains columns that correspond to attributes of the parent type. A column within the parent type's database table may store references to the child type's database table. Within the child type's database table, the values corresponding to the child type still may be stored in a single column as a LOB. When values corresponding to a child type are stored in this manner, the values are said to be stored "out-of-line."

Figure 3:
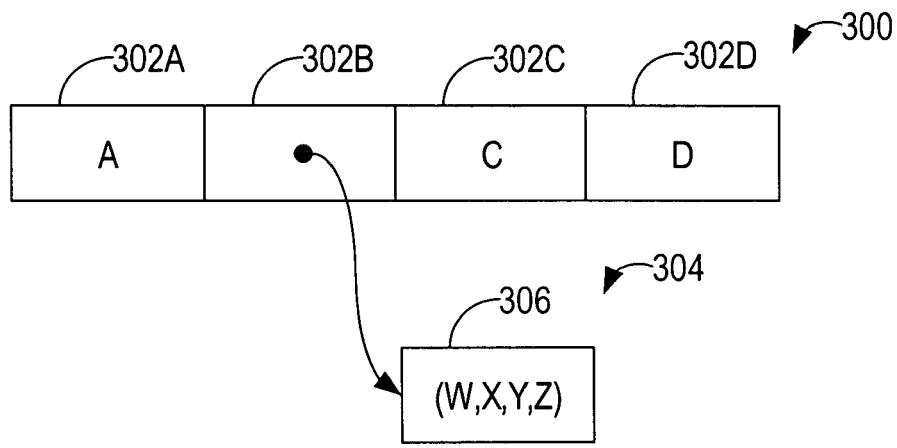
FIG. 3 is a block diagram that illustrates a row of a database table in which multiple values associated with an instance of a child type are stored out-of-line from a database table that stores values associated with an instance of a parent type.

FIG. 3 is a block diagram that illustrates a row of a database table 304 in which multiple values associated with an instance of a child type are stored out-of-line from a database table 300 that stores values associated with an instance of a parent type. Values "A," "C," and "D," associated with the parent type, are stored in columns 302A, 302B, and 302D, respectively. Column 302B stores a reference to column 306 of database table 304. Multiple values "(W,X,Y,Z)," associated with the child type, are stored out-of-line in column 306 as a LOB.

However, multiple values do not need to be stored as a LOB. Each of the multiple values may be stored in a separate row of a single column in the child type's database table. A first row of the column may store a first of the values, a second row of the column may store a second of the values, and so on. Sets of values within separate instances may be stored in separate sets of rows in the same column of the child type's database table. For example, values of a first instance of the child type may be stored in the first N rows of the column, values of a second instance of the child type may be stored in the next N rows of the column, and so on. When values corresponding to a child type are stored in this manner, the values are said to be stored in a "nested table."

Figure 4A:
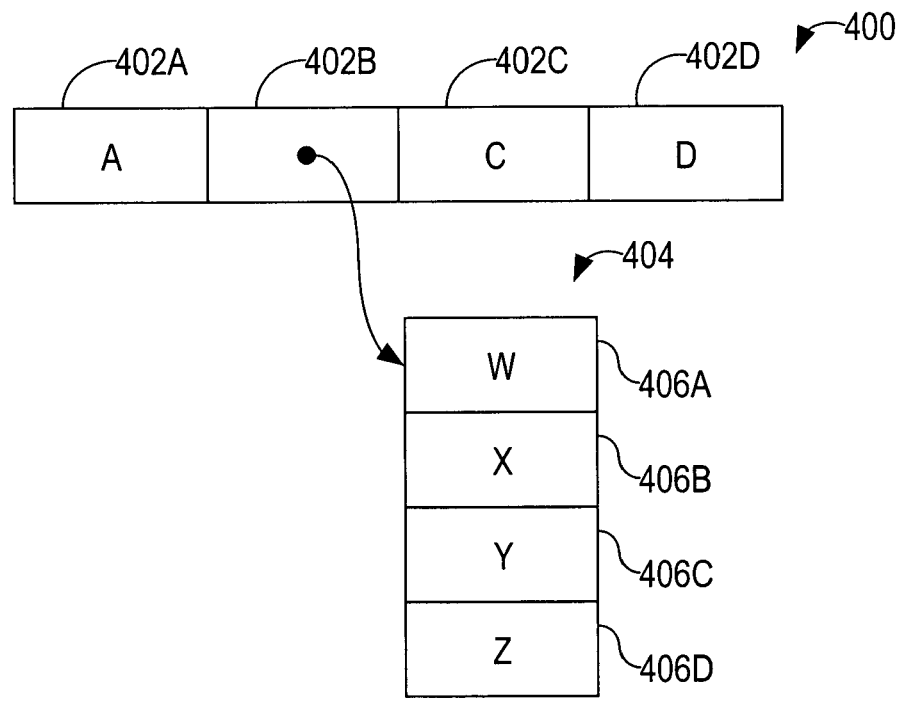
FIG. 4A is a block diagram that illustrates multiple rows of a nested database table in which multiple values associated with an instance of a child type are stored.

FIG. 4A is a block diagram that illustrates multiple rows of a nested database table 404 in which multiple values associated with an instance of a child type are stored. Values "A," "C," and "D," associated with the parent type, are stored in columns 402A, 402B, and 402D, respectively. Column 402B stores a reference to rows 406A-408D of database table 404. Values "W," "X," "Y," and "Z," associated with the child type, are stored in rows 406A-408D, respectively, of nested table 404. In this case, the values are stored in separate rows, and not as a LOB.

Figure 4B:
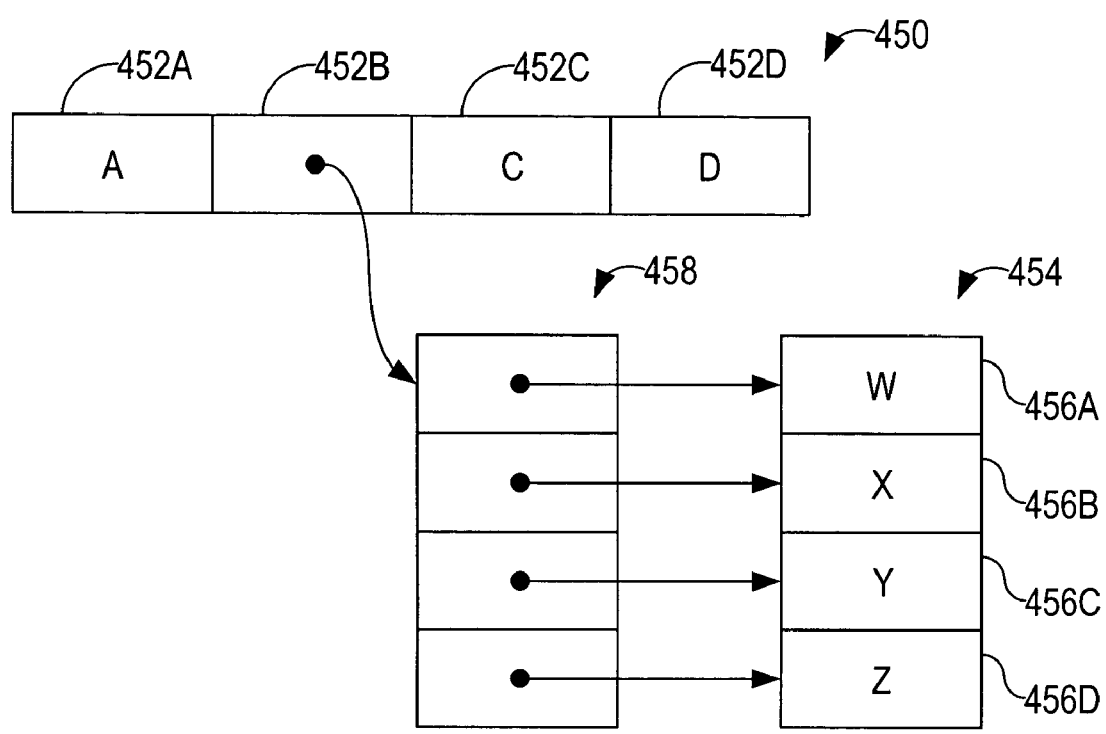
FIG. 4B is a block diagram that illustrates multiple rows of a nested database table in which multiple values associated with an instance of a child type are stored out-of-line.

FIG. 4B is a block diagram that illustrates multiple rows of a nested database table 454 in which multiple values associated with an instance of a child type are stored out-of-line. Values "A," "C," and "D," associated with the parent type, are stored in columns 452A, 452B, and 452D, respectively. Column 402B stores a reference to a table of pointers 458. Each row in table of pointers 458 contains a pointer that points to a separate row of database table 454. Values "W," "X," "Y," and "Z," associated with the child type, are stored in rows 456A-458D, respectively, of nested table 454. In this case also, the values are stored in separate rows, and not as a LOB.

To associate the multiple rows in the child type's database table with the single row in the parent type's database table, the corresponding rows from both database tables may be associated with a set identifier that distinguishes those associated rows from other associated rows in the database tables. For example, the first row in the parent type's database table and the first N rows in the child type's database table may be associated with a first unique set identifier, the second row in the parent type's database table and the second N rows in the child type's database table may be associated with a second unique set identifier, and so on.

There is no limitation on the levels of indirection that may be used when storing instances of nested types in nested tables. A nested type may indicate an attribute that is of another nested type. Thus, a row of a nested table may indicate a reference to another out-of-line database table or nested table.

Based on characteristics of the nested type, one way of storing instances of the nested type may be selected over other ways. A schema processor may make such a selection.

A nested table notably is useful for storing a collection that may be defined by an XML schema. Such a collection comprises zero or more instances of a type. The XML schema may indicate a minimum and/or maximum number of instances of the type that are to be contained in the collection. A nested table corresponding to such a collection may be created to comprise a number of rows equal to the maximum number of instances that will be in the collection.

Example System for Directly Loading Semiconstructed Data

Figure 5:
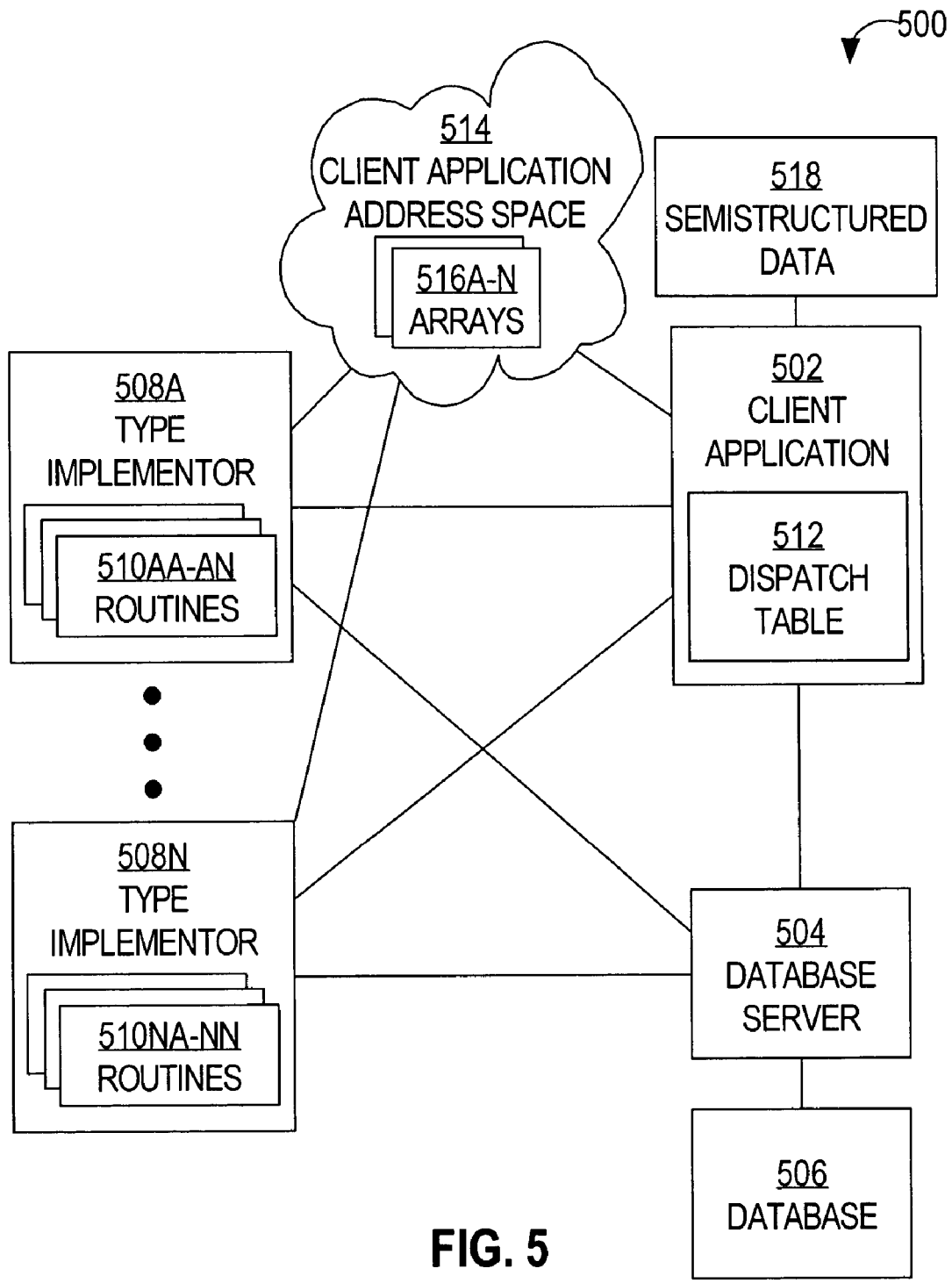
FIG. 5 is a block diagram that illustrates a system, according to an embodiment of the present invention, in which semistructured data may be stored in a database according to the direct path loading approach.
Figure 6C:
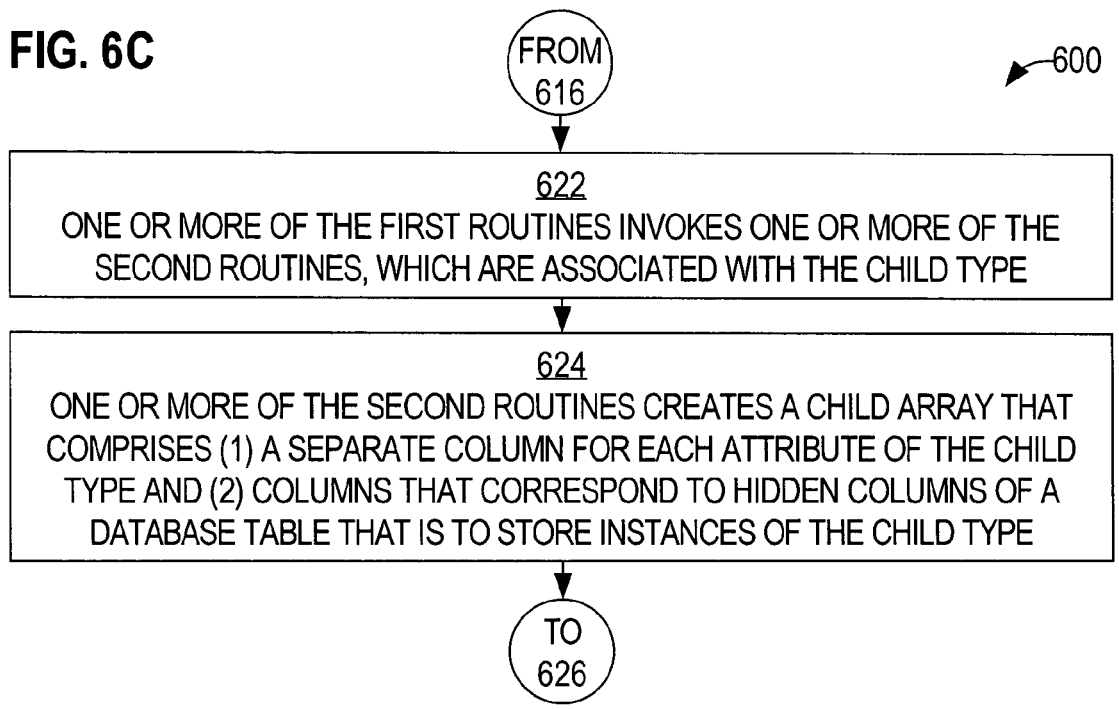

FIG. 5 is a block diagram that illustrates a system 500 in which semistructured data may be stored in a database according to the direct path loading approach, according to an embodiment of the present invention. System 500 comprises a client application 502, a database server 504, a database 506, and type implementors 508A-N. Client application 502, database server 504, and type implementors 508A-N are coupled communicatively to each other. Database server 504 is coupled communicatively to database 506.

Client application 502 reads or otherwise receives semistructured data 518 as input. Semistructured data 518 comprises instances of a type. For example, semistructured data 518 may comprise one or more XML instances that conform to an XML schema. Semistructured data 518 also comprises an identity of the type. For example, the type may be identified as an XML type. Semistructured data 518 does not indicate the structure of the type. The structure of the type is not defined to client application 502.

Based on semistructured data 518, client application 502 determines the identity of the type to which the instances conform. Client application consults dispatch table 512 to find, within the dispatch table, an entry that indicates the identity of the type. Dispatch table 512 comprises a separate entry for each of type implementors 508A-508N. Each entry indicates memory addresses of routines that are implemented by the type implementor that implements the type that is indicated by that entry. Table 1 below depicts an example of entries within a dispatch table.

TABLE 1

EXAMPLE DISPATCH TABLE ENTRIES

| TYPE IDENTITY | ADDRESSES OF ROUTINES |
|---|---|
| Identity of type implemented by type implementor 508A | Address of routine 510AA . . . Address of routine 510AN |
| . . . | . . . |
| Identity of type implemented by type implementor 508N | Address of routine 510NA . . . Address of routine 510NN |

The entries in dispatch table are added by client application 502 in response to type implementors 508A-N registering routines 510A-510NN with the client application. Each type implementor provides client application 502 with the information needed to add an entry for the type implemented by that type implementor. For example, type implementor 508A may load routines 510AA-AN into locations in memory, and then specify those locations to client application 502.

In response to finding, in dispatch table 512, an entry that indicates the identity of the type, client application 502 invokes the routines located at the memory addresses indicated by the entry. For example, if the type is implemented by type implementor 508A, then client application 502 invokes routines 510AA-510AN. If the type is an XML type, then client application 502 invokes routines that are associated with the XML type in the dispatch table.

One or more of the invoked routines creates an array 516A in client application address space 514. Client application address space 514 comprises a segment of memory allocated for use by client application 502. Array 516A comprises a separate column for each attribute of the type.

For example, an invoked routine may initialize a context for the type. Another invoked routine may indicate a number of columns in a database table that is to store instances of the type. For example, one implementation of an XML type maps to two top-level columns of a database table, in which one of the two top-level columns is a hidden column. The hidden column is for storing a positional descriptor, and the user-visible column is for storing a LOB or a reference to an out-of-line or nested table. Therefore, an invoked routine of the XML type implementor creates an array with two columns that correspond to the two top-level columns of the database table.

One or more of the invoked routines populates the columns of array 516A, including columns that correspond to hidden columns of a database table, with values. Some values may be specified in semistructured data 518, and other values may be derived from values specified in the semistructured data. Each value specified in semistructured data 518 corresponds to a separate attribute of the type.

Client application 502 may pass such values as parameters to one or more of the invoked routines. For example, for each instance specified within semistructured data 518, client application 502 may pass a single block of combined values, which represent that instance, as a parameter to one or more routines. The one or more routines may parse the block of combined values to produce separate values that correspond to the separate attributes of the type.

One or more of the invoked routines stores the values in corresponding columns of array 516A. Each row of array 516A stores values for a different instance specified in semistructured data 518. One of more the invoked routines returns, to client application 502, one or more pointers to one or more addresses within client application address space 514 at which one or more populated rows of array 516A can be found. Using the one or more pointers, client application 502 can locate and read the populated rows of array 516A.

One or more of the attributes of the type may be of a nested type that indicates one or more other attributes. For example, a parent type might indicate a first attribute that is of a scalar type, and a second attribute that is of a "purchase order" child type. The "purchase order" type also might indicate several attributes. In this case, the routines associated with the parent type invoke routines associated with the child type. The client application does not need to be aware of or invoke routines associated with the child type. When a routine is invoked to describe the structure of the parent type, that routine invokes another routine to describe the structure of the child type. When a routine is invoked to create an array for the parent type, that routine invokes another routine to create an array for the child type. When a routine is invoked to populate the array for the parent type, that routine invokes another routine to populate the array for the child type.

The number of columns in an array generated by a child type's implementor is based on the number of columns in a database table that is to store instances of the child type. If instances of a child type are stored in a nested table, then the array generated for the child type may contain one column that corresponds to the one column of the nested table, and each instance of the child type may be stored in a different row of the array column. Thus, multiple rows of a child array may correspond to a single row of a parent array. To preserve this correspondence, a set identifier is generated. The set identifier links the row of the parent array with the corresponding rows of the child array. The set identifier is stored in the parent array.

Each array may be populated independently of each other array. Arrays may be loaded and streamed asynchronously and independently.

Based on the populated rows of one or more arrays, the client application 502 generates a data stream. A data stream for one array may be generated independently of a data stream for another array. The data stream conforms to the format of data blocks within database 506. As a result, the data stream generated by client application 502 may be written directly to database 506 without causing the SQL engine to load each row of data. Client application 502 streams the data to database server 504. A stream generated based on one array may be sent to the database server independently of a stream generated based on another array. Database server 504 writes the data received from client application 502 directly into one or more data blocks in database 506. Values in array columns that correspond to hidden columns in database tables are stored in the corresponding hidden columns as a result of the writing.

Memory Management

Because the amount of memory available in client application address space 514 is limited, array 516A might not comprise enough rows to store, concurrently, values of all of the instances that are specified in semistructured data 518. Therefore, after a specified number of rows of array 516A have been populated, a data stream may be generated based on those populated rows, and the data may be streamed to database server 504. Then, the memory that the populated rows occupy may be freed. Once the memory has been freed, array 516A may be re-populated with values of additional instances for which a data stream has not yet been generated. This process may be repeated until data streams for all of the instances indicated in semistructured data 518 have been generated and streamed to database server 504.

Different arrays may be populated independently of each other. Different arrays may be associated with different database tables that comprise different numbers of rows. Values stored in such different arrays may be flushed to persistent storage at different times. Memory that stores one array may be freed before other memory that stores another array. For example, a parent array may be associated with a database table that comprises five rows, while a child array may be associated with a nested database table that comprises twenty-five rows. Rows in the child array may be populated, streamed to the database server, and re-populated multiple times before rows in the parent array are streamed to the database server once.

Managing Nested Types

Semistructured data 518 might comprise instances of a type "A" that comprises two attributes: an attribute "B" of a scalar type and an attribute "C" of a type "D" that is implemented by type implementor 508A. In turn, type "D" might comprise two attributes "E" and "F," both of scalar types.

In this example, the structure of type "A" is defined, at a high level, to client application 502. Client application 502 possesses sufficient information to generate, in client application address space 514, an array (array "A") to store instances of type "A". Array "A" comprises a column (column "B") for attribute "B" and a column (column "C") for attribute "C."

Client application 502 populates rows of array "A" on a per-instance basis. Because attribute "B" is of a scalar type, client application 502 may populate column "B" without invoking any external routines. Because attribute "C" is of a type implemented by type implementor 508A, client application 502 invokes one or more of routines 510AA-AN for each instance of type "A." For each instance, client application 502 passes a combined value block, which represents the value of attribute "C" for that instance, to the routines.

For each instance, the routines generate, in client application address space 514, columns (columns "E" and "F") corresponding to attributes "E" and "F" of type "D." For each instance, the routines populate columns "E" and "F" with corresponding values of attributes "E" and "F" separated out from the combined value block received as a parameter. For each instance, the routines return, to client application 502, a pointer to populated columns "E" and "F". Client application 502 stores the pointer in column "C" in the instance's corresponding row of array "A."

Client application 502 does not possess sufficient information about type "D" to free memory that stores instances of type "D." Therefore, when client application 502 is going to free memory that stores values for attribute "B," the client application also invokes one or more of routines 510AA-AN to free memory that stores the corresponding values for attributes "E" and "F."

When client application 502 is going to free memory that contains a pointer to columns "E" and "F", the client application passes the pointer as a parameter to one or more of routines 510AA-AN. Those routines then free the memory to which the pointer points. Client application 502 does not free the memory that stores the pointer until the client application invokes the routines that free the memory to which the pointer points.

Reference Counts

Multiple arrays may reference the same temporary data structure in memory. Such a data structure should be maintained in memory as long as at least one array is referencing the data structure. Only after no arrays are referencing a data structure should the memory that stores that data structure be freed for other purposes. Therefore, a separate reference count may be associated with each such temporary data structure in memory. When an array begins to make reference to a given data structure, then the reference count associated with that data structure is incremented. When an array no longer needs to make reference to a given data structure, then the reference count associated with that data structure is decremented. When a data structure's reference count is zero, then the memory that stores that data structure may be freed for other purposes.

Example Routines Implemented by a Type Implementor

Client application 502 may invoke different routines to perform different functions relative to a type. For example, each of routines 510AA-AN may perform a different function relative to a type implemented by type implementor 508. Such functions may include:

Allocating and initializing a general context block;
Indicating a type of a database table in which instances of the type are to be stored;
Indicating a number of columns in a database table in which instances of the type are to be stored;
Indicating types of columns in a database table in which instances of the type are to be stored;
Initializing a context for a database table in which instances of the type are to be stored;
Allocating memory, in client application address space 514, for one or more arrays to store values of instances of the type;
Parsing combined value blocks and storing separated values into separate columns of one or more arrays;
Freeing memory that stores values of an instance of a type;
Flushing existing populated memory structures to persistent storage;
Completing the direct path loading and freeing all memory that was allocated to perform the direct path loading; and
Aborting the direct path loading and freeing all memory that was allocated to perform the direct path loading.

Different routines may accept different parameters and return different results. Client application 502 may invoke one or more of routines 510AA-510AN sequentially in an order designed to achieve the ultimate goal of storing instances of the type in database 506 according to the direct path loading approach.

Error Management

Client application 502 may specify actions to be performed when an error occurs during the performance of any of the techniques described herein. For example, when such an error occurs, client application 502 may update an error counter value and determine whether the error counter value is greater than a specified threshold. Client application 502 may indicate that the techniques currently being performed should continue, despite the errors, unless the error counter value is greater than the specified threshold. Client application 502 may indicate that the techniques currently being performed, and techniques that will be performed thereafter, should be aborted if the error counter value is greater than the specified threshold.

It is desirable for routines 510AA-NN to handle errors in a way that is consistent with the way that client application 502 handles errors. Therefore, according to one embodiment, client application 502 passes memory addresses of error handling routines, which are implemented by the client application, to routines 510AA-NN. When any of routines 510AA-NN determines that an error has occurred, that routine executes an error handling routine that is located at the specified memory address. Thus, if an error handling condition is satisfied during the execution of any of routines 510AA-NN, actions connected to the satisfaction of the condition will be performed just as if the condition had been satisfied outside of the execution of such a routine.

Example Technique for Storing Semistructured Data in a Database According to the Direct Path Loading Approach FIGS. 6A-6D are flow diagrams that illustrate a technique 600, according to an embodiment of the present invention, for storing semistructured data in a database according to the direct path loading approach. Such semistructured data may comprise multiple different instances that conform to an XML schema.

In block 602, a "first" type implementor registers, with a client application, routines that are implemented by the first type implementor (the "first routines"). For example, type implementor 508A may register routines 510AA-AN with client application 502.

In block 604, the client application adds, to a dispatch table, an entry that indicates an association between the first routines and a parent type that the first type implementor implements. For example, client application 502 may add, to dispatch table 512, an entry that indicates an association between routines 510AA-AN and the type implemented by type implementor 508A. The parent type includes an attribute that is of a child type that is implemented by a "second" type implementor.

In block 606, the second type implementor registers, with the client application, routines that are implemented by the second type implementor (the "second routines"). For example, type implementor 508B may register routines 510BA-BN with client application 502.

In block 608, the client application adds, to the dispatch table, an entry that indicates an association between the second routines and the child type that the second type implementor implements. For example, client application 502 may add, to dispatch table 512, an entry that indicates an association between routines 510BA-BN and the type implemented by type implementor 508B.

In block 610, the client application receives semistructured data that specifies instances of the parent type. Each instance of the parent type specifies an instance of the child type. For example, client application 502 may read semistructured data 518, which may indicate (1) values of instances of the parent type and (2) the identity of the parent type.

In block 612, the client application determines, from the dispatch table, which routines are associated with the parent type. For example, client application 502 may determine, from dispatch table 512, that the parent type is associated with the first routines, routines 510AA-AN.

In block 614, the client invokes one or more of the first routines, which are associated with the parent type. For example, client application 502 may invoke routine 510AA to initialize a context block. Client application 502 may invoke routine 510AB to determine a type of a database table that will store instances of the parent type (the "parent database table"). Client application 502 may invoke routine 510AC to determine how many columns are in the parent database table. Client application 502 may invoke routine 510AD to determine the types of the columns in the parent database table.

In block 616, in response to its invocation, one or more of the first routines creates a "parent" array that comprises (1) a separate column for each attribute of the parent type and (2) columns that correspond to hidden columns of the parent database table. For example, when invoked, routine 510AE may create array 516A in client application address space 514. Array 516A might comprise two columns, one of which corresponds to a hidden column of a database table.

In block 622, one or more of the first routines invokes one or more of the second routines, which are associated with the child type. For example, routine 510AA may invoke routine 510BA to initialize a context block. Routine 510AB may invoke routine 510BB to determine a type of a database table that will store instances of the child type (the "child database table"). Routine 510AC may invoke routine 510BC to determine how many columns are in the child database table. Routine 510AD may invoke routine 510BD to determine the types of the columns in the child database table.

In block 624, in response to its invocation, one or more of the second routines creates a "child" array that comprises (1) a separate column for each attribute of the child type and (2) columns that correspond to hidden columns of the child database table. For example, when invoked, routine 510BE may create array 516B in client application address space 514. Array 516B might comprise five columns, two of which correspond to hidden columns of a database table.

Blocks 626-628 may be performed concurrently with blocks 630-632. In block 626, in response to its invocation, one or more of the first routines populates, with values of instances of the parent type, parent array columns that correspond to the attributes of the parent type. For example, when invoked, routine 510AF may populate one or more columns of array 516A with values of instances that are specified in semistructured data 518.

In block 628, in response to its invocation, one or more of the first routines populates, with other values, parent array columns that correspond to hidden columns of the parent database table. The other values might not be specified in the semistructured data, and might not be values that correspond to attributes of the parent type. However, the other values might be derived from the semistructured data. For example, when invoked, routine 510AF may populate some of the columns of array 516A with other values that are derived from semistructured data 518.

In block 630, in response to its invocation, one or more of the second routines populates, with values of instances of the child type, child array columns that correspond to the attributes of the child type. For example, when invoked, routine 510BF may populate one or more columns of array 516B with child type instance values that are specified in semistructured data 518.

In block 632, in response to its invocation, one or more of the second routines populates, with other values, child array columns that correspond to hidden columns of the child database table. The other values might not be specified in the semistructured data, and might not be values that correspond to attributes of the child type. However, the other values might be derived from the semistructured data. For example, when invoked, routine 510BF may populate some of the columns of array 516B with other values that are derived from semistructured data 518.

One or more set identifiers may be included among the values with which the parent and child arrays are populated. As described above, a set identifier associates a row in the parent array with a set of rows in a child array. Both the parent and child arrays may be generated with a column to store a set identifier.

In block 634, the client application generates a data stream based on the populated rows of one or more of the arrays. For example, based on populated arrays 516A and 516B, client application 502 may generate one or more data streams that conform to the format of data blocks stored in database 506.

In block 636, the client application streams the data to a database server 504. For example, client application 502 may stream data to database server 504.

In block 638, the database server writes the data directly into the database. For example, database server 504 may write data received from client application 502 directly into one or more data blocks in database 506. Values in array columns that correspond to hidden columns in database tables are stored in the corresponding hidden columns as a result of the writing.

Thus, semistructured data, such as instances of an XML schema, may be stored in a database according to the direct path loading approach. As is discussed above, the direct path loading approach is faster and consumes less memory than the conventional path loading approach. Using the techniques and systems described above, instances of an XML type may be stored in a database even after the XML type definition has been extended, without modifying either the client application or the database server.

Hardware Overview

Figure 7:
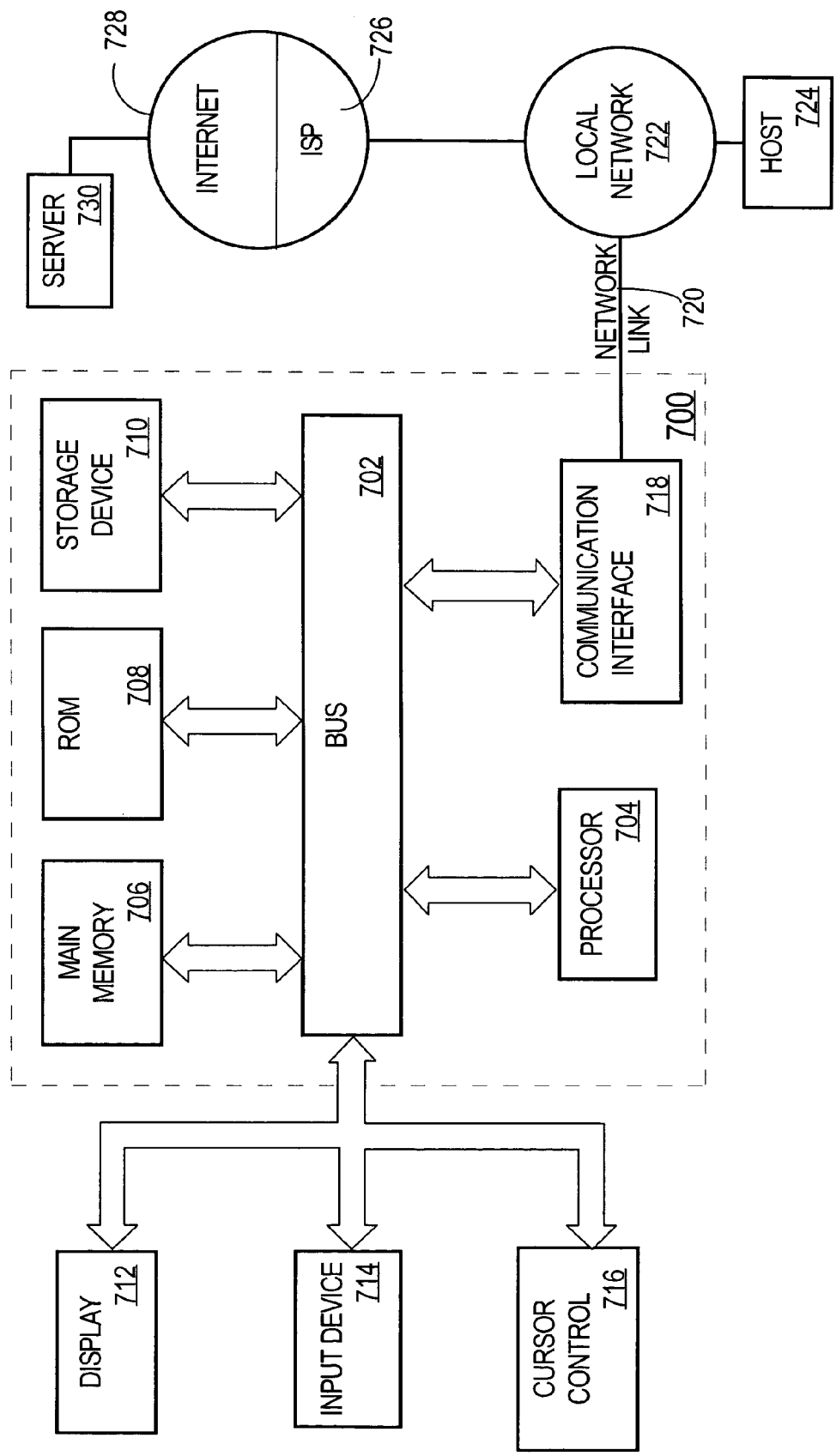
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of storing data into a database, the method comprising:
   determining one or more routines that are associated with a type of data received by a client application, wherein said one or more routines are implemented by a program that is external to both said client application and a database server that manages said database;
   invoking said one or more routines;
   in response to said one or more routines being invoked, said program performing steps comprising:
   determining one or more first values that are specified in said data, wherein said one or more first values correspond to one or more attributes of said type; and
   determining one or more second values that correspond to one or more hidden columns of one or more tables in said database;
   generating, based on said one or more first values and said one or more second values, a data stream that conforms to a format of data blocks of said database; and
   writing said data into one or more data blocks in said database.

2. The method of claim 1, further comprising:
   in response to said one or more routines being invoked, said program performing steps comprising:
   creating a data structure that comprises:
   one or more first elements that correspond to said one or more attributes; and
   one or more second elements that correspond to said one or more hidden columns;
   populating said one or more first elements with said one or more first values; and
   populating said one or more second elements with said one or more second values;
   wherein said generating of said data stream is based on said data structure.

3. The method of claim 2, wherein said data structure is created in memory that is associated with said client application.

4. The method of claim 1, wherein at least one of said one or more second values is associated with said one or more first values and distinguishes said one or more first values from other values in said data.

5. The method of claim 1, wherein at least one of said one or more second values describes a position of said one or more first values relative to other values in said data.

6. The method of claim 1, wherein a number of attributes of said type is not defined to said client application.

7. The method of claim 1, wherein a type of an attribute of said type of said data is not defined to said client application.

8. The method of claim 1, wherein said generating and said writing are performed without causing a Structured Query Language (SQL) engine to load said data.

9. The method of claim 1, wherein determining said one or more routines comprises locating addresses of one or more routines that are in a same entry as an identity of said type.

10. The method of claim 1, further comprising:
    adding, to a table, an entry that indicates an association between said type and said one or more routines.

11. The method of claim 1, further comprising:
    invoking one or more routines that are located at one or more addresses that are associated with said type.

12. A method of storing data into a database, the method comprising:
    a client application receiving data that conforms to a first type definition that indicates two or more first attributes, wherein at least one of said two or more first attributes is of a type that is defined by a second type definition that indicates two or more second attributes;
    determining one or more first routines that are associated with said first type definition, wherein said one or more first routines are external to both said client application and a database server that manages said database;
    calling said one or more first routines;
    in response to one or more calls to said one or more first routines:

creating a first data structure with two or more first elements that correspond to said two or more first attributes; and populating said two or more first elements with two or more first values that are specified in said data, wherein said two or more first values correspond to said two or more first attributes;

calling one or more second routines that are associated with said second type definition;

in response to one or more calls to said one or more second routines creating a second data structure with two or more second elements that correspond to said two or more second attributes; and populating said two or more second elements with two or more second values that are specified in said data, wherein said two or more second values correspond to said two or more second attributes;

generating, based on said first data structure and said second data structure, a data stream that conforms to a format of data blocks of said database; and writing said data into one or more data blocks in said database.

13. The method of claim 12, further comprising:

generating a set identifier that is associated with one of said one or more first elements; and populating a plurality of elements in said second data structure with said set identifier.

14. A volatile or non-volatile computer-readable medium carrying one or more sequences of instructions which, when executed by one or more processors, causes the one or more processors to perform the method recited in claim 1.

15. A volatile or non-volatile computer-readable medium carrying one or more sequences of instructions which, when executed by one or more processors, causes the one or more processors to perform the method recited in claim 2.

16. A volatile or non-volatile computer-readable medium carrying one or more sequences of instructions which, when executed by one or more processors, causes the one or more processors to perform the method recited in claim 3.

17. A volatile or non-volatile computer-readable medium carrying one or more sequences of instructions which, when executed by one or more processors, causes the one or more processors to perform the method recited in claim 4.

18. A volatile or non-volatile computer-readable medium carrying one or more sequences of instructions which, when executed by one or more processors, causes the one or more processors to perform the method recited in claim 5.

19. A volatile or non-volatile computer-readable medium carrying one or more sequences of instructions which, when executed by one or more processors, causes the one or more processors to perform the method recited in claim 6.

20. A volatile or non-volatile computer-readable medium carrying one or more sequences of instructions which, when executed by one or more processors, causes the one or more processors to perform the method recited in claim 7.

21. A volatile or non-volatile computer-readable medium carrying one or more sequences of instructions which, when executed by one or more processors, causes the one or more processors to perform the method recited in claim 8.

22. A volatile or non-volatile computer-readable medium carrying one or more sequences of instructions which, when executed by one or more processors, causes the one or more processors to perform the method recited in claim 9.

23. A volatile or non-volatile computer-readable medium carrying one or more sequences of instructions which, when executed by one or more processors, causes the one or more processors to perform the method recited in claim 10.

24. A volatile or non-volatile computer-readable medium carrying one or more sequences of instructions which, when executed by one or more processors, causes the one or more processors to perform the method recited in claim 11.

25. A volatile or non-volatile computer-readable medium carrying one or more sequences of instructions which, when executed by one or more processors, causes the one or more processors to perform the method recited in claim 12.

26. A volatile or non-volatile computer-readable medium carrying one or more sequences of instructions which, when executed by one or more processors, causes the one or more processors to perform the method recited in claim 13.

* * * * *

UNITED STATES PATENT AND TRADEMARK OFFICE
CERTIFICATE OF CORRECTION

| | | |
|---|---|---|
| PATENT NO. | : 7,814,047 B2 | Page 1 of 1 |
| APPLICATION NO. | : 10/648600 | |
| DATED | : October 12, 2010 | |
| INVENTOR(S) | : Namit Jain et al. | |

It is certified that error appears in the above-identified patent and that said Letters Patent is hereby corrected as shown below:

On page 2, in column 2, under "Other Publications", line 2, delete "Avilable" and insert -- Available --, therefor.

On page 2, in column 2, under "Other Publications", line 14, delete "Obejcts" and insert -- Objects --, therefor.

In column 7, line 26, delete ""C"," and insert -- "C," --, therefor.

In column 8, line 48, delete "Semiconstructed" and insert -- Semistructured --, therefor.

Signed and Sealed this
Seventeenth Day of May, 2011

David J. Kappos
*Director of the United States Patent and Trademark Office*